United States Patent [19]

Maze et al.

[11] Patent Number: 4,661,413
[45] Date of Patent: Apr. 28, 1987

[54] COMPOSITE MATERIALS ASSOCIATING AN AMORPHOUS BARIUM FLUORIDE COATING WITH A SUBSTRATE AND PREPARATION PROCESSES OF THESE MATERIALS

[75] Inventors: Gwenael Maze, Rennes; Jean-Yves Carree, Uzel; Marcel Poulain, Rennes, all of France

[73] Assignee: Le Verre Fluore S.A., France

[21] Appl. No.: 705,397

[22] Filed: Feb. 25, 1985

Related U.S. Application Data

[63] Continuation of Ser. No. 436,789, Oct. 26, 1982, abandoned.

[30] Foreign Application Priority Data

Oct. 27, 1981 [FR] France .............................. 814017125

[51] Int. Cl.$^4$ .......................... C03C 3/112; C03C 8/00
[52] U.S. Cl. ........................................ 428/432; 65/45; 65/51; 65/59.1; 65/60.1; 65/60.7; 501/40; 501/904; 428/433; 427/422
[58] Field of Search ............... 65/45, 51, 59.1, 60.7, 65/59.22, 60.53, 60.8, DIG. 15; 501/40, 904; 427/422; 428/649, 431, 432, 433

[56] References Cited

U.S. PATENT DOCUMENTS

| | | | |
|---|---|---|---|
| 2,015,483 | 9/1935 | Lilienfeld | 65/59.22 |
| 2,642,633 | 6/1953 | Dalton | 65/45 |
| 2,744,034 | 5/1956 | Dalton et al. | 65/45 X |
| 4,173,459 | 11/1979 | Aulich et al. | 65/60.8 X |
| 4,221,825 | 9/1980 | Guerder et al. | 65/60.8 X |
| 4,341,873 | 7/1982 | Robinson et al. | 65/30.1 X |

FOREIGN PATENT DOCUMENTS

| | | | |
|---|---|---|---|
| 2445820 | 9/1980 | France | 501/40 |
| 0145050 | 9/1982 | Japan | 501/40 |

OTHER PUBLICATIONS

"Etude Comparée de Verres Fluorés dans les Diagrammes Ternaires Zr.F$_4$–BaF$_2$–MmF$_n$", by Poulain et al, 1979, Revue de Chimie Minerale, vol. 16, pp. 267-276.

Primary Examiner—Arthur Kellogg
Attorney, Agent, or Firm—Laff, Whitesel, Conte & Saret

[57] ABSTRACT

The invention gives a coating with a very high vitrification rate. The resulting surface has physicochemical characteristics which are similar to those of fluoride glass. In order to achieve this result, the material constituting the fluoride glass enamel quickly crosses the temperature range between the melting point and the glossy transition temperature. Moreover, the metallic substrate temperature must be high enough to enable an active physiochemical process at the glass-metal interface which results in a correct "hooking". A "hooking" temperature is higher than one where a physical adhesion occurs, which results from Van der Waals interactions without any formation of chemical bonds at the glass-metal interface. The particular chemical reactivity of molten fluorides, which otherwise results in critical problems of corrosion, is in this case a favorable factor which generally reduces the hooking temperature to a level which is far below the glass melting temperature.

16 Claims, 2 Drawing Figures

COMPOSITE MATERIALS ASSOCIATING AN AMORPHOUS BARIUM FLUORIDE COATING WITH A SUBSTRATE AND PREPARATION PROCESSES OF THESE MATERIALS

This is a continuation of U.S. patent application Ser. No. 06/436,789, filed Oct. 26, 1982, now abandoned.

The present invention relates to the manufacture of composite materials including at least one fluoride or halide material in a completely or partially amorpheous form, the materials having both substrate physical characteristics and coating physicochemical surface properties which will be conserved in the resulting composite materials.

Although more specifically related to various processes for enameling metallic surfaces with fluoride glasses, the invention also relates to amorphous coatings derived from vitreous compositions deposited onto crystalline, vitreous or ceramical substrates as well as metallic or crystalline coatings onto vitreous samples. The invention also relates to composite materials wherein one of the components, either vitreous or not, displays a specific structure, such as a fibrous or lamellate structure, which substantially influences the whole behavior.

The new fluoride glasses which constitute the starting point of the invention have been described in U.S. Pat. No. 4,141,741 and U.S. patent application Ser. No. 244,280 now abandoned. Such fluoride glasses have a set of remarkable characteristics which results directly from their unusual composition and completely new crystallochemical structure. Such glasses are made from fluorides $MF_4$ (M=Zr, Hf, Th, Ti, U), $MF_3$ (M=Al, Cr, Fe, Ga, Ln, Y), $MF_2$ (M=a 3d transition metal, Mg, Zn), taken either alone or in combination. There is a possible association with one or several fluorides of alkali, earth-alkali or equivalent cations, such as the fluorides of Pb, Ti, Bi, Eu(II). They do not contain beryllium, except as a trace element.

When made from fluorides at their maximum oxidation state, they are resistant to the most aggressive fluorinating reagents. In addition, those which are derived from fluorides which are insoluble into water are thus the most convenient for handling fluoride reagents in aqueous medium, such as the fluorhydric acid that is commonly used in electronic technology. The large electronegativity of $F^-$ anions give the fluoride glasses very good dielectric properties while the relative mobility of the fluorine ions in the vitreous matrix makes it possible to achieve various electrochemical devices. The anti-adhesive properties of fluorinated surfaces are well-known which results in a different behavior in damping, surface chemical hooking and mechanisms of attack by water vapor and polar gaseous molecules. Viscoelastic and acoustico-optic properties of fluoride glasses are substantially different from those of conventional oxide glasses. Finally, the major interest in fluoride glasses lies in their optical properties with respect to U.V., visible and infrared transmittance, low dispersion, potential laser applications and non-linear optic applications.

However, this set of unique properties is hampered by poor mechanical properties arising from the vitreous structure and especially from the bad resistance to thermal and mechanical shocks and traction forces, together with a low thermal conductivity. These properties lead to severe limitations in practical realizations.

This invention aims at balancing those drawbacks by associating a fluoride glass, constituting the major element within the combination, with a substrate, the nature and the structure of which gives good characteristics to the final product.

The manufacture of such composite materials lays down specific problems in a direct relationship with the particular composition and structure of halide glasses. First, the chemical reactivity of fluorides at high temperature results in attacking a number of substrates. There is an excessive response to atmospheric moisture as well as an important corrosion of the metallic pieces in contact with molten glass. In addition, such fluoride glasses have a viscosity which changes very sharply when increasing temperature and which makes it much more difficult to control a number of technological parameters. Finally, the crystallization tendency of those special glasses is very important over a specific temperature range. This phenomenon, which is correlated to the steep viscosity profile, is enhanced by all previously described corrosion and chemical attack processes because they induce a large heterogenous nucleation.

Therefore, it is necessary to carry out techniques which are suitable to the particular nature of these materials. Although an enameling of metallic substrates has been the subject of numerous studies of late years, it is usually carried out by means of traditional technics which are older than the industrial age. Generally, the enameling process includes several steps: surface preparation, spraying the material over the metal, melting and cooling. Such an operation method is appropriate for the traditional enamels which are derived from conventional silica glasses. Such silica glasses do not suffer noticeable alteration due to moisture. The enamel vitrification occurs spontaneously with increasing temperature, such a vitrification being almost irreversible. Indeed, the complete recrystallization of the vitreous matrix requires a very long time at the usual operation temperature.

In the case of the above-mentioned fluoride glasses, the same techniques are not suitable for achieving enameled coatings, for the too high of a crystallization rate. The hydrolysis phenomena at high temperature will hamper the vitrification of the fluoride-glass enamel which then becomes hetrogeneous and porous.

The present invention aims at giving the coating a very high vitrification rate in such a way that the resulting surface has physicochemical characteristics similar to those of the originating fluoride glasses. In order to achieve this result, it is necessary for the material constituting the fluoride glass enamel to quickly cross the temperature range between the melting point and the glassy transition temperature. Moreover, the metallic substrate temperature must be high enough to allow an active physicochemical process at the glass-metal interface which results in a correct hooking.

A hooking temperature is defined as one below which only a physical adhesion is observed which results from Van der Waals interactions, without any formation of chemical bonds inside the glass-metal interface. The particular chemical reactivity of molten fluorides otherwise results in critical problems of corrosion. A favorable factor generally reduces the hooking temperature far below the glass melting temperature. On the other hand, these fluoride glasses usually have a very low liquidus temperature which indirectly explains the very high crystallization tendency. This presupposedly unfavorable feature has the advantage of making possible coating processes which could not be carried out with conventional materials.

In its elementary mode, a process according to the present invention comprises laying the molten fluoride glass onto the substrate in such a way that the molten glass is at a temperature which is higher than or as high as the liquidus temperature. The temperature of the substrate is kept lower than the liquidus temperature and as close as possible to the glassy transition. In this way, the coating solidification is rapidly achieved by the contact of the substrate. The enamel obtained by this method is quickly cooled by thermal conduction until some equilibrium state is reached between the decreasing enamel temperature and the increasing substrate temperature. At this stage, the whole combination of enamel and substrate is cooled by thermal exchanges with either the outside or an enclosure having a temperature which is controlled and programmed. As the actual temperature is then above the glassy transition temperature, the coating has a rather low viscosity and, therefore, plasticity which is enough to avoid the occurrence of excessive mechanical stress. The same result is achieved if glass is deposited not in a liquid phase, but in a vapor phase: in this case, the substrate temperature becomes the major control element.

Any laying process must respect those conditions which are derived from the particular nature of the coating glasses. Such conditions apply for all low melting viscosity glasses, even if the crystallization rate is high. That is, fluoride glasses are derived from zirconium, hafnium, transition metals or actinides. All of these glasses having a low melting temperature, the operations may usually be carried out within a temperature range which is not higher than 600°–700° C., which makes their technological achievement easier.

The choice of every vitreous composition obviously depends on the nature of the substrate. Also, the well-known criteria of thermal expansion compatibility must be taken into account. It is necessary that the molten glass temperature does not induce some irreversible alterations of the substrate such as melting or inelastic warping. There is a critical temperature above which a convenient hooking occurs between enamel and substrate. It is generally better when this temperature lies in a range where the glass crystallization rate is low, i.e. in practice below the crystallization temperature as determined by differential thermal analysis.

The laying method which has just been described may be achieved in several ways resulting in processes which, although different in their achievement, all derive from the present invention. The various processes are:
 plunging,
 pouring,
 molten glass throwing,
 arc melting, and
 vacuum deposition.

A BRIEF DESCRIPTION OF THE DRAWINGS

Figure 1:
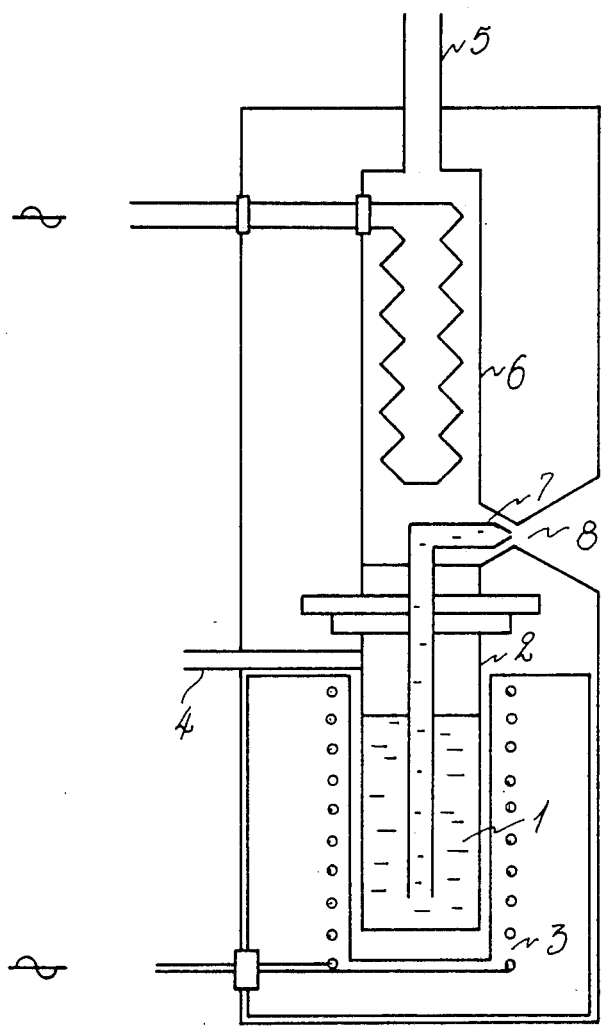
FIG. 1 shows a spraying apparatus with flow control means to draw molten glass into a gas stream for spray coating.

A first process according to the invention is to plunge the sample to be coated in a fluoride glass melt, then to remove and cool it in suitable conditions. This technique, which is made possible due to the low viscosity of fluoride glasses, is efficient for the treatment of small samples and has no major drawbacks if the melt temperature is not excessive for the substrate.

By way of example, an aluminum plate, with a size of $4 \times 8$ cm, has been plunged for three seconds at 570° in a glass having the following molar composition:

$$ZrF_4 54\%, BaF_2 29\%, LaF_3 3\%, NaF 10\%, AlF_3 4\%.$$

The metal had been preheated at 340° C. and the cooling had been carried out in the laboratory atmosphere. The average coating thickness was 800 microns.

An alternative of this first process relates to long samples having an invariable constant section, along their whole length, such as: wires, cylinders, sheets and various shaped-steels. The sample is simply pushed through a geometrically adapted aperture of a container containing the glass. For instance, an immersion crucible may be made with a bottom having an aperture with exactly the same profile as the cross-section of the sample to be coated, but larger by 0.1 to 1 mm along its periphery. The crucible is filled with molten glass. The correctly preheated samples are then moved one with respect to the other in such a way that the whole sample passes through the crucible bottom aperture. The crucible, being vertical, the coating thickness is determined by the surface tension and the temperature of molten glass if enameling is to be achieved from bottom to top, and by the exit-aperture size if it is made from top to bottom, i.e. if the enameled part is moved down and out of the crucible bottom. A sample having a U-shaped section, 5 mm thick, 5 cm wide and 1.5 m long, made of aluminum alloy AU4G has thus been coated with a glass of molar composition:

$$ZrF_4 57\%, BaF_2 34\%, LaF_3 5\%, AlF_3 4\%$$

contained in a graphite crucible having a capacity of 500 cm$^3$, at 620° C. and the crucible bottom having a similar U-shaped aperture, 6 mm thick and 5.1 cm wide. The U-shaped sample, after having been preheated at 400° C., was kept steady in a vertical position and the crucible and its heating device have been moved from bottom to top at a speed of 10 cm/s. A removable plate is set under the crucible for preventing glass from flowing before entering the sample. The average coating thickness was 400 microns.

A second process according to the invention consists in pouring the fluoride glass melt onto the previously preheated sample. For enameling a container inside, a very simple and efficient operation way is to fill this container with molten glass, then to drain it. Afterward, a glass layer remains, the thickness of which depends essentially on the temperatures of molten glass and substrate. If the container volume would require large amounts of molten glass, a satisfactory result may be achieved by pouring the molten glass along the walls and giving the container a suitable rotation motion in such a way that molten glass is kept on the wall and spread by centrifugation. This process is well adapted to samples having an axial rotation symmetry.

As an example of working out by pouring, the inside walls of an aluminum square tube of internal section $50 \times 50$ mm have been enameled along 10 cm height by pouring a glass of molar composition:

$ZrF_3 57\%$, $BaF_2 34\%$, $LaF_3 5\%$, $AlF_3 4\%$ at 620° C. and draining it off, the initial tube temperature being 350°. An AU4G alloy tube having a diameter of 20 mm has been enameled along 25 cm in an identical way.

As another example, a stainless steel container 6 cm in diameter and 12 cm high has been enameled by pouring at 800° C., a glass with molar composition:

$AlF_3 30\%$, $YF_3 30\%$, $BaF_2 20\%$, $ThF_4 20\%$ along its inside walls. The container rotation speed was 80 rpm, the starting temperature 420° C. and the final coating thickness 700 microns.

A third process according to this invention is to spray molten glass onto the sample to be coated in appropriate conditions of temperature and atmosphere. The molten glass does not appear then as a liquid bulk which is either static or moving. Instead, it is a series of molten droplets with an adjustable speed which come down on the sample to be coated. This process which is more difficult to carry out has the advantage of allowing a better control of the amount of glass which is deposited per unit surface. Moreover, it allows large temperature differences between molten glass and substrate and increases the quenching effects which makes possible the use of vitreous compositions that are less stable against devitrification. This process may be carried out in various ways depending on the used molten glass or powdered glass.

Starting from molten glass, a first possiblity is to carry along and scatter this molten glass by means of a temperature controlled gaseous flow. A device according to this invention which may be used to achieve this process includes three main parts: a tank containing the molten glass at an adjustable temperature, a hot gas producer, a part including gas and molten glass delivery means wherein the glass scattering is achieved. The molten glass flow may be adjusted by the size and geometry of the output orifices. It obviously depends on the glass viscosity at the operation temperature. The liquid drawing may be induced either by the single aspiration of the gaseous flow, the temperature and pressure of which are adjustable, or by the glass pressure in the output orifice. This pressure simply results from gravity if the output orifice is located at the tank bottom or from a gaseous or mechanical pressure applied at the melt surface. Gaseous flow may be dehydrated air or inert gas, such as nitrogen, argon or rare gas. Its temperature is usually kept at 600° C. or more in order to avoid nucleation and glass solidification in the inlet pipes and the output device. This device is constructed in such a way that a gaseous flow passes near the glass input orifice in enough of a volume to induce a depression therein and scatter the molten glass into small droplets. It does not differ in its principle from a conventional paint spraying device, but it sets specific constraints in its achievement because of the operating temperature and the particular chemical behavior of the fluoride melts.

FIG. 1 shows a particular, but not limitative embodiment of such a spraying apparatus for spraying molten fluoride glasses by gaseous drawings which may be used for enameling. The fluoride glass melt 1 is contained in a nickel tank 2 and kept at a convenient temperature by a heating device 3. The gaseous pressure above the melt is controlled through a vacuum tube 4 which allows the glass to be in a pressure suppression or depression with respect to atmospheric pressure. The drawing gas is introduced by the input 5 and passes through a heating area 6 before reaching an output nozzle 7, spraying and dragging along the molten glass coming from a jet 8 set at the center of the nozzle.

Always starting from molten glass another process is to give the fluoride glass melt a pressure which is high enough to force it to pass through a very small output orifice which induces the liquid scattering in small droplets with a suitable kinetical energy, without the help of any external gaseous flow. Simpler in its principle, this alternative implies the use of important pressure and high working temperatures: the glass melt is often heated above 600° C. The hot part of the apparatus must undergo only limited pressure stresses and the enclosure under pressure must be kept at a temperature close to room temperature. This may be practically achieved by inserting the container filled with a fluoride glass melt and the heating furnace in a larger enclosure which is externally cooled at a temperature low enough to allow a convenient mechanical resistance.

Figure 2:
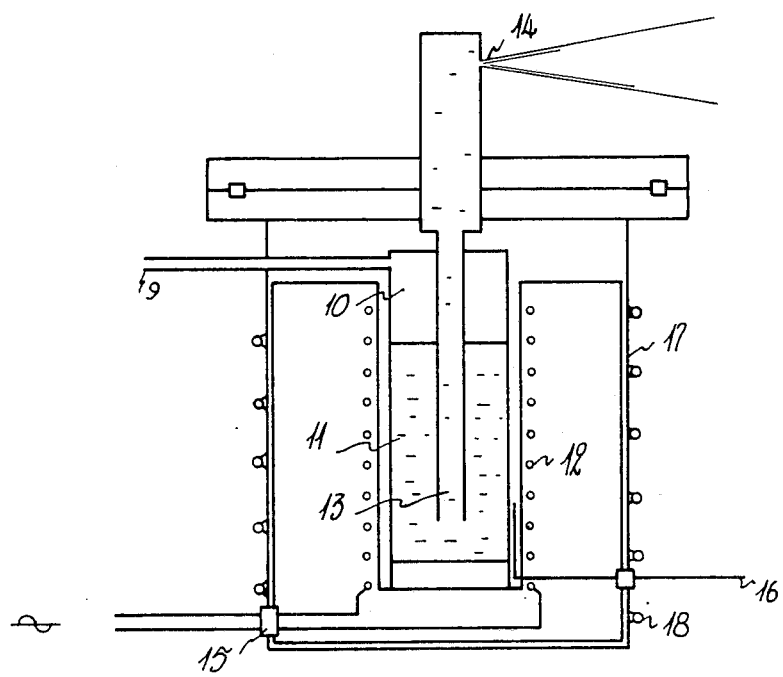
FIG. 2 shows a spraying apparatus having a means to pressurize the molten glass for direct spray application onto a surface.

FIG. 2 shows a spray device as an indicative, in no way limitative, embodiment of this invention operating as described above. One-hundred bars of compressed argon is introduced via the input 9 into the enclosure 10. Then, the pressure is applied to the glass surface 11, which is kept in a melt by a heating device 12 that is conveniently insulated. The pressure constraints the liquid glass to pass through the tube 13 toward the orifice 14, which may be 50 microns in diameter. The power supply of the furnace 12 is provided through insulated connections 15 and the temperature control is provided by the thermocouple 16. The external enclosure 17 completely surrounds the enclosure 10 and the furnace 12 is cooled by a water flow pipe system 18. This apparatus has allowed the enameling of an aluminum plate 50×30 cm in size with a glass of the same composition as in the above last cited example. The glass melt temperature was 650° C. and the plate was preheated at 360° C.

Another process for spraying molten glass is to start from glass powder of controlled granulometry, to quickly heat it up to a melting temperature immediately before laying it on the substrate. The heating that is needed for melting may be provided in two different ways: either by a hot plasma generated by a conventional generator or the combustion of suitable gases in an adequate ratio. In this latter case, the use of oxygen as the combustive medium results in water formation at high temperature and, therefore, in a partial glass hydrolysis. In fact, one observes that the glass attack rate from water vapor is low enough for keeping a sufficient vitrification rate in the final coating. The use of chemical reagents in the gaseous flow allows a reduction of the hydrolysis effect and one may quote as an example carbon tetrachloride, trichlorethylen or carbon fluorochloride $C_2F_2Cl_2$, and more generally, hydrocarbons in which one part or all the hydrogen atoms have been substituted by halogens. Carrying out this enameling process according to this invention may be made simple by using commerical devices for metallization from metal powder. The best results are observed when the gases at the device input have been previously dried. Several dozen of aluminum and steel plates have been coated with a glass of molar composition:

$ZrF_3 50\%$, $NaF 22.5\%$, $BaF_2 20\%$, $ThF_4 7.5\%$ using a spraying gun JET PMR from the Societe Nationale de Metallisation Industrielle, working with propane, oxygen and compressed air and with a 80-100 microns powder. The oxygen flow was drawing carbon tetrachloride at its saturating vapor pressure at 25° C. The use of a plasma gun for powdered-glass melting before laying on enables a much higher vitrification rate than with a combustion spraying gun. However, it is necessary to preheat the substrate as previously indicated, at a temperature which is higher than the hooking temperature and to fit the plasma powder with the nature of the glass used and the introduced amount of glass. Several plates of 18/8 stainless steel have thus been coated over 350 microns in thickness by a glass with the molar composition:

$AlF_3 30\%, ThF_4 20\%, YF_3 30\%, BaF_2 20\%$ and introduced as a 100 microns powder.

A fourth process according to this invention is to spray the powdered glass over the sample surface to be coated, to heat the whole combination to the hooking temperature, then to locally induce the glass melting by the action of an electric arc that is mobile with respect to the surface to be coated. The distance between the arc and surface is variable and it depends on the glass nature. After melting the sample, it is quickly cooled, as in all the other processes, down to a glass-transition temperature, then by steps down to room temperature.

As an example of a possible embodiment of this process, an aluminum tube 15 cm in diameter and 45 cm in length has been, in a first step, internally covered with a uniform glass layer with the following glass composition:

$ZrF_4 50\%, BaF_2, NaF 22.5\%, ThF_4 7.5\%.$

For achieving this process, this glass initially 80 microns in granumometry has been mixed with trichlorethylen in order to form a flux which has been then uniformly layed on the inside of the cylinder, then dried. The tube preheated at 400° C. has been secured to a mechanical device giving it a rotation speed at 50 rpm. An electric arc device with two graphite electrodes has been approached at around 15 mm from the internal surface, then linearly moved, parallel to the cylinder axis at a speed of 0.2 cm/s. The resulting coating has a largely vitreous aspect and a good behavior under high electric potential.

Another process according to this invention takes advantage of the noticeable vapor pressure of the fluoride glass melts. It comprises vaporizing the glass and condensing it on the surface to be coated. In order to avoid any pollution by atmospheric elements and because of the reduced vapor pressure of molten fluoride mixtures, it is better in practice to operate under vacuum. Vitreous layers with a variable and adjustable thickness may thus be deposited on any kind of substrate by heating the glass beyond its melting temperature inside an enclosure under vacuum. However, obtaining a convenient enameling requires the preheating of the substrate at a suitable temperature. A particular advantage of this last process is to enamel thermally weak substrates. If the conventional criteria of physical compatability are suitable, one only needs to reach the hooking temperature, which is the thermodynamical level for the formation of the substrate glass interface. This level is positioned below the composition temperature of the material to be coated. Otherwise, the quenching effect is strong which allows the vitreous deposits to be obtained from a less stable composition.

As an example, a copper plate 5×5 cm in size has been coated by a 1000 Angstroms layer of a glass with a molar composition:

$ZrF_4 62\%, BaF_2 32\%, LaF_3 6\%$ and heated above a melting point in an enclosure with a starting vacuum of $10^{-5}$ torrs, while the copper plate has been preheated around 400° C.

In a particular embodiment, the substrate structure is not compact, and may appear as a set of fibers, layers or aggregates to be glass coated afterward. Thus, the use of a metallic grid as a substrate allows the making of large bulk glass to thermal and mechanical shocks.

As an example, a parallelipipedic tank 6×5×5 cm in internal size has been obtained by associating an aluminum grid made from an 0.6 diameter wire and a mesh of 2.5 mm and a glass with the following composition:

$ZrF_4 57\%, BaF_2 34\%, LaF_3 5\%, AlF_3 4\%.$

In its general mode, the invention also concerns the achievement of composite materials in which the substrate, continuous or not, is made from a halide or fluoride glass and the coating material an organic polymer or a metal glass. As a particular example, glass fibers from the composition:

$ZrF_4 57\% BaF_2 34\%, LaF_3 5\%, AlF_3 4\%$ have been externally coated with a thermohardening polyurethane resin.

Finally, the invention allows a deposit of a variable composition of vitreous layers on a vitreous substrate of the same nature, for example, $ZrF_4$-based glasses. Thus, by the above-described vapor-phase deposition process, a continuous index variation may be obtained from the deposit surface to the starting vitreous sample. A suitable fitting achieves a cylindric gradient index from which optical fibers may be made.

An an example, a disc of the following fluoride glass:

$ZrF_4 57\%, BaF_2 34\%, LaF_3 5\%, AlF_3 4\%$ has been coated by a 1 micron aluminum layer by vacuum deposition.

Materials thus obtained may be used in various fields because of their specific physical properties. They may be used as electric insulators even if the coating is very thin while allows their use in micro-electronics. Their unusual inertia versus the most corrosive chemical reagents warrants their use in chemical engineering. Electrochemical applications are possible for glasses displaying some ionic conductivity either in electrochemical generators or as a specific membrane. Thin layer deposits may also be used to protect weak optical components operation in infrared or ultra-violet spectrum.

What is claimed is:

1. A process for enameling with a vitreous fluoride coating a composite material including a crystalline, vitreous, ceramic or metallic substrate, the process comprising the steps of:
   (a) holding said substrate at a temperature just below the glassy transition temperature of a fluoride glass coating, said substrate being an object made of aluminum preheated to a range of about 340°–400° C. and having a size and shape which is to be coated in its entirety, and said coating comprising a fluoride glass melt, (b) coating said substrate by pouring said melt of said fluoride glass coating over said object while said melt is in a liquid or gaseous phase by uniformly spreading said coating on the substrate, said melt being heated to a range of approximately 570°–620° C. and said coating having a composition of approximately:
ZrF$_4$ 54%–57%;
BaF$_2$ 29%–34%;
LaF$_3$ 3%–5%;
NaF$_0$ 10%; and
AlF$_3$ 4%,
said coating being applied over a period of time lasting about three seconds, (c) adjusting the temperature of said substrate to be at a temperature which is lower than the melting temperature of said coating, the substrate temperature being high enough to enable a physiochemical hooking process of physical adhesion to occur at the interface between the substrate and the fluoride glass coating, and (d) establishing an environmental temperature surrounding said composite material which quickly cools and solidifies said coating by a thermal conduction between coating and substrate which decreases the coating temperature while increasing the substrate temperature to an equilibrium state which is above the glassy transition temperature.

2. A process of enameling crystalline, ceramic or metal substrate comprising, providing an enameling fluoride glass composition containing approximately 20–34% BaF$_2$ wherein the fluorine anions are present in the fluoride glass composition in an amount greater than the amount of any other anions present in the glass composition;

heating said fluoride glass composition to its liquid phase;

heating and maintaining the portion of said substrate to be enameled to a temperature exceeding the transition temperature of said fluoride glass composition, and coating the heated substrate with the liquid fluoride glass composition to provide the desired enameled substrate.

3. The process of claim 2 wherein said flouride glass composition is
20–34% : BaF$_2$
0–62% : ZrF$_4$
0–30% : YF$_3$
0–6% : LaF$_3$
0–30% : AlF$_3$
0–22.5% : NaF
0–20% : ThF$_4$.

4. The process of claim 3 wherein the temperature of said substrate is lower than the melting temperature of said fluoride glass composition and high enough to enable a physiochemical hooking process of physical adhesion to occur at the interface between the substrate and the fluoride glass coating; and establishing an environmental temperature surrounding siad composite material which quickly cools and solidifies said fluoride glass coating by a thermal conduction between said coating and said substrate which decreases the coating temperature while increasing the substrate temperature to an equilibrium state which is above the glassy transition temperature.

5. The process of claim 4 wherein the substrate is metal selected from the group consisting of aluminum, an aluminum alloy, stainless steel and copper.

6. A product made by the process of claim 5.

7. A product made by the process of claim 4.

8. The process of claim 2 wherein said fluoride glass composition is
29–34% : BaF$_2$
54–57% : ZrF$_4$
3–5% : LaF$_3$
0–10% : NaF
4% : AlF$_3$ 9. The process of claim 2 wherein said fluoride glass composition is selected from the group consisting of
a. 57% ZrF$_4$, 34% BaF$_2$, 5% LaF$_3$, 4% AlF$_3$
b. 62% ZrF$_4$, 32% BaF$_2$, 6% LaF$_3$,
c. 54% ZrF$_4$, 29% BaF$_2$, 3% LaF$_3$, 4% AlF$_3$, 10% NaF
d. 50% ZrF$_4$, 20% BaF$_2$, 7.5% ThF$_4$, 22.5% NaF; and
e. 20% BaF$_2$, 20% ThF$_4$, 30% YF$_3$, 30% AlF$_3$.

10. The process of claim 2 wherein said fluoride glass composition is selected from the group consisting of
a. 57% ZrF$_4$, 34% BaF$_2$, 5% LaF$_3$, 4% AlF$_3$
b. 62% ZrF$_4$, 32% BaF$_2$, 6% LaF$_3$,
c. 54% ZrF$_4$, 29% BaF$_2$, 3% LaF$_3$, 4% AlF$_3$, 10% -NaF
d. 50% ZrF$_4$, 20% BaF$_2$, 7.5% ThF$_4$, 22.5% NaF; and
e. 20% BaF$_2$, 20% ThF$_4$, 30% YF$_3$, 30% AlF$_3$; and
the substrate is metal selected from the group consisting of aluminum, an aluminum alloy, stainless steel and copper.

11. A product made by the process of claim 10.
12. A product made by the process of claim 1.
13. A product made by the process of claim 3.
14. A product made by the process of claim 8.
15. A product made by the process of claim 9.
16. A product made by the process of claim 2.

* * * * *